Patented July 10, 1923.

1,461,445

UNITED STATES PATENT OFFICE.

LESTER KIRSCHBRAUN, OF CHICAGO, ILLINOIS.

COMPOSITION FOR SATURATING FABRICS AND PROCESS OF MAKING SAME.

No Drawing.   Application filed October 5, 1921. Serial No. 505,653.

*To all whom it may concern:*

Be it known that I, LESTER KIRSCHBRAUN, a citizen of the United States, residing in the city of Chicago, county of Cook, and State of Illinois, have invented certain new and useful Improvements in Compositions for Saturating Fabrics and Processes of Making Same, of which the following is a specification.

This invention relates to compositions for fabrics and process of making same and is more particularly directed to the saturation of fabrics, as for example, tape, canvas, duck and tarpaulin. The invention consists essentially in making an emulsion of water, a colloidal agent, as for example, clay, and asphalt or bitumen and then adding to the emulsion a liquid oil fluxing agent. The invention may be described as a cold saturation for fabrics of the character referred to. The invention is characterized by the fact that while the water forms the external phase of the emulsion, the emulsion nevertheless possesses adhesive characteristics in one of its constituents.

The product can be made from relatively cheap materials available in large quantities. By the use of the liquid fluxing agent, the emulsion breaks easily and also acts more effectively as a saturant. It is to be noted that in its broader aspects, the invention covers an emulsion in which two bituminous constituents, preferably of different character, each form the internal phase of an emulsion with water as the external phase. The harder bituminous constituents may be petroleum or asphaltic residues or any form of natural or artificial asphalt, solid or semi-solid, which should, however, be in heated fluid condition at the time the emulsion is made.

The softer fluxing oil may be topped crude oil such as obtained from the relatively cheap heavy Mexican or California petroleum oils. In certain cases, other pitches may be substituted for the asphalt referred to but if, for example, coal tar should be used, the solvent should be a solvent for coal tar, as for example, creosote oil.

The following illustrative method of carrying out the invention may be given: Petroleum asphalt of say 10 to 20 penetration at 77 degrees F. and having a melting point of say 140 to 170 degrees F. is reduced to fluid condition by heat. While in this fluid heated condition, this asphalt is added to a previously formed aqueous mixture of water and colloidal clay in such a way as to form an emulsion in which water constitutes the external phase. The water is preferably hot at the time the heated asphalt is added to it. The proportion of the aqueous constituents of the emulsion may be varied as desired. For purposes of shipping it may be desirable to make a relatively thick emulsion in which case the proportion of water will be less than if the emulsion is to be made at the point where it is laid. A relatively thick emulsion may consists of say 35% water, 10% clay and 55% asphalt. The above percentages are on a weight basis.

To this emulsion while the latter is either hot or cold, is added the fluxing agent, as for example, the topped Mexican crude above referred to of about 10 Baumé gravity, or instead of the topped Mexican crude, slop distillate, gas oil, or other oil cuts may be used as a fluxing agent. The percentage of the fluxing agent will vary with the character of the fluxing agent used, for example, in the case of topped Mexican crude about 20 parts might be added to the 100 parts of asphalt used. Where a lighter oil is used, a less percentage of fluxing agent may be used. On the other hand, where a heavier fluxing agent is used, a larger percentage could be used.

The amount and character of this fluxing agent is adjusted so that when combined with the harder asphalt in the emulsion, the resulting composition will produce a binder having a high degree of cementitiousness or toughness and will have the property of readily flowing and fluxing with the harder asphalt contained in the emulsion.

It is to be understood that the mere addition of this fluxing agent does not in itself break the emulsion, but places the emulsion in a condition so that when it is distributed in thin films, the bituminous constituents thereof readily flow together and coalesce. It is to be understood that the fluxing agent itself forms an emulsion with the water and colloidal clay, thus in effect constituting a system in which two distinct bituminous constituents form the internal phase of the same emulsion.

The emulsion above described may now be used as a cold saturation for various forms of fabric or for pasting paper, as for example, in carton boards, etc. The fabrics may be run through a tank containing this cold saturation which may be applied either at atmospheric pressure or under a pressure of from 50 to several hundred pounds or under a vacuum.

I claim as my invention:

1. A process of making an emulsion, consisting in mixing water, clay and bitumen while the last is in heated liquid condition so that the water constitutes the external phase of the emulsion, and adding thereto a hydrocarbon flux.

2. A process of making an emulsion, consisting in mixing colloidal clay, and water, adding thereto a bitumen while the latter is in heated liquid condition so as to form an emulsion, then adding thereto a hydrocarbon oil substantially liquid at normal temperatures, the two hydrocarbon constituents forming the internal and the water the external phase of the emulsion.

3. A waterproofing composition, consisting of an emulsion of water, clay bitumen and a hydrocarbon oil, the two hydrocarbon constituents forming the internal phase and the water the external phase of the emulsion.

4. A process of making an emulsion consisting in mixing water, an emulsifying agent and bitumen while the last is in heated liquid condition so that the water constitutes the external phase of the emulsion, and adding thereto a hydrocarbon flux.

LESTER KIRSCHBRAUN.